United States Patent [19]

Shields

[11] Patent Number: 4,744,142

[45] Date of Patent: May 17, 1988

[54] CABLE GUIDE ASSEMBLY FOR USE WITH ELECTRICAL CONNECTOR APPLYING MACHINES

[76] Inventor: Charles E. Shields, 655 Woodland, Crystal Lake, Ill. 60014

[21] Appl. No.: 923,768

[22] Filed: Oct. 27, 1986

[51] Int. Cl.[4] ........................ H01R 43/04; B23P 19/00

[52] U.S. Cl. .......................................... 29/749; 29/861

[58] Field of Search ........................ 29/861, 564.4, 749

[56] References Cited

U.S. PATENT DOCUMENTS

| | | | |
|---|---|---|---|
| 4,554,733 | 11/1985 | Caverey | 29/749 |
| 4,566,164 | 1/1986 | Brown et al. | 29/749 X |
| 4,580,340 | 4/1986 | Shields | 29/861 |
| 4,597,158 | 7/1986 | Hirohawa et al. | 29/749 X |

*Primary Examiner*—Timothy V. Eley

*Attorney, Agent, or Firm*—Hill, Van Santen, Steadman & Simpson

[57] ABSTRACT

There is disclosed herein an apparatus for applying an electrical connector to a multiconductor cable. The apparatus includes a supply means for carrying and dispensing flat multiconductor cable. A drive receives cable from the supply and delivers the cable to a connector applying station. The connector applying station includes spaced sections for receiving connector sections and advancing and applying the connector section to the cable. A drive is mounted in a housing in a position between the supply and connector applying section. There is further provided an entry guide positioned between the supply and drive roller for laterally applying cable delivered to the cable received by the drive. Exit guide means positioned between the drive rollers and connector applying sections engage the cable and accurately laterally positioning the same.

7 Claims, 2 Drawing Sheets

CABLE GUIDE ASSEMBLY FOR USE WITH ELECTRICAL CONNECTOR APPLYING MACHINES

BACKGROUND OF THE INVENTION

This invention relates to an apparatus for applying electrical connectors to electrical conductors, and more particularly, to a guide for use in guiding flat multiconductor cable of the type used in the electrical industry, particularly the computer industry, to a station at which an electrical connector is applied.

Flat multiconductor cable is used extensively in the computer industry to interconnect various electronic components and systems. The actual connection is made by connectors which are staked to or terminated on the cable. Each connector includes a pair of sections of halves which include a body and a cap for contacting the conductors, for sandwiching the cable between the connector halves, and for securing the connector to the cable. The body portion includes a plurality of tine-like contacts which cut the insulation surrounding the conductors and electrically contact the conductors. The connector cap engages the connector body, positions the cable between the cap and body and secures the connector to the cable.

Machines for terminating or staking a connector to a cable are known in the art and one such machine is disclosed in U.S. Pat. No. 4,580,340. In that machine the cable is fed from a reel to a cable assembly or connector applying station. Each station includes a pair of connector section feed devices or magazines, connector receiving tooling and pneumatic rams for moving the tooling between a retracted connector-receiving position and an extended staking or terminating position.

The cable is guided from the reel to the connector applying position at the station. In one form of cable, the conductors are spaced from one another by 0.050 inch. In other words, the distance between conductor centers is 0.050 inch. Thus it can be appreciated that minor positional variations in the cable can cause the connector tine to engage more than one conductor and cause shorts, opens, or similar defects.

Thus it is desirable to increase the accuracy of cable positioning at the connector applying station.

It is therefore an object of this invention to provide a cable guide system for accurately positioning the multiconductor cable relative at a connector applying station.

These and other objects of this invention will become apparent from the following description and appended claims.

SUMMARY OF THE INVENTION

There is provided by this invention a cable guide system positioned between the cable supply reel and the cable connector applying station for accurately guiding the cable to the station. The guide is positioned adjacent the connector applying station so as to assure accurate positioning of the cable at the station.

The guide is formed as part of a roller housing assembly and includes a housing defining an upper or entry slot for receiving the cable from the supply reel, aligning it transversely and guiding the cable into a pair of feed rollers. A guide edge assembly is aligned with the guide slot and positioned between the rollers and connector applying station. The guide edges are spaced apart from one another a distance which is an integral multiple of the center distances between the cable. Thus the guide can engage the grooves between the conductors.

DESCRIPTION OF THE PREFERRED EMBODIMENT

Figure 1:
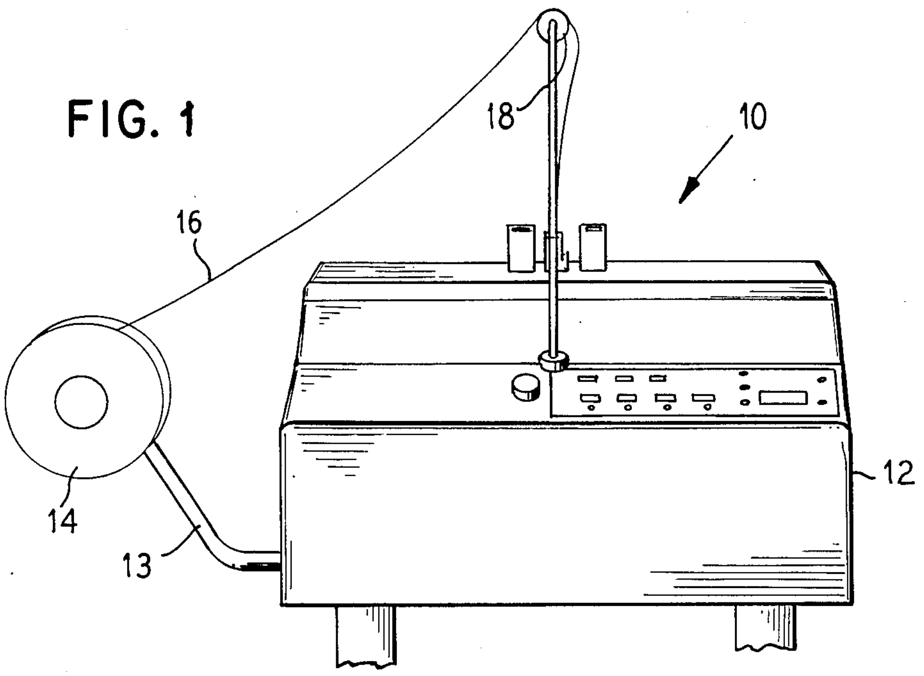
FIG. 1 is a diagrammatic view showing the connector applying machine.

Referring now to FIG. 1, a connector applying machine 10, generally, is shown. The machine includes an openable casing 12 within which a connector applying station and operating mechanism is enclosed. An arm 13 extends from the machine and a cable supply reel 14 is rotatably mounted on an end of the arm. A flat multiconductor cable 16 is fed from the reel over an idler wheel 18 and then down into the machine 10.

Figure 3:
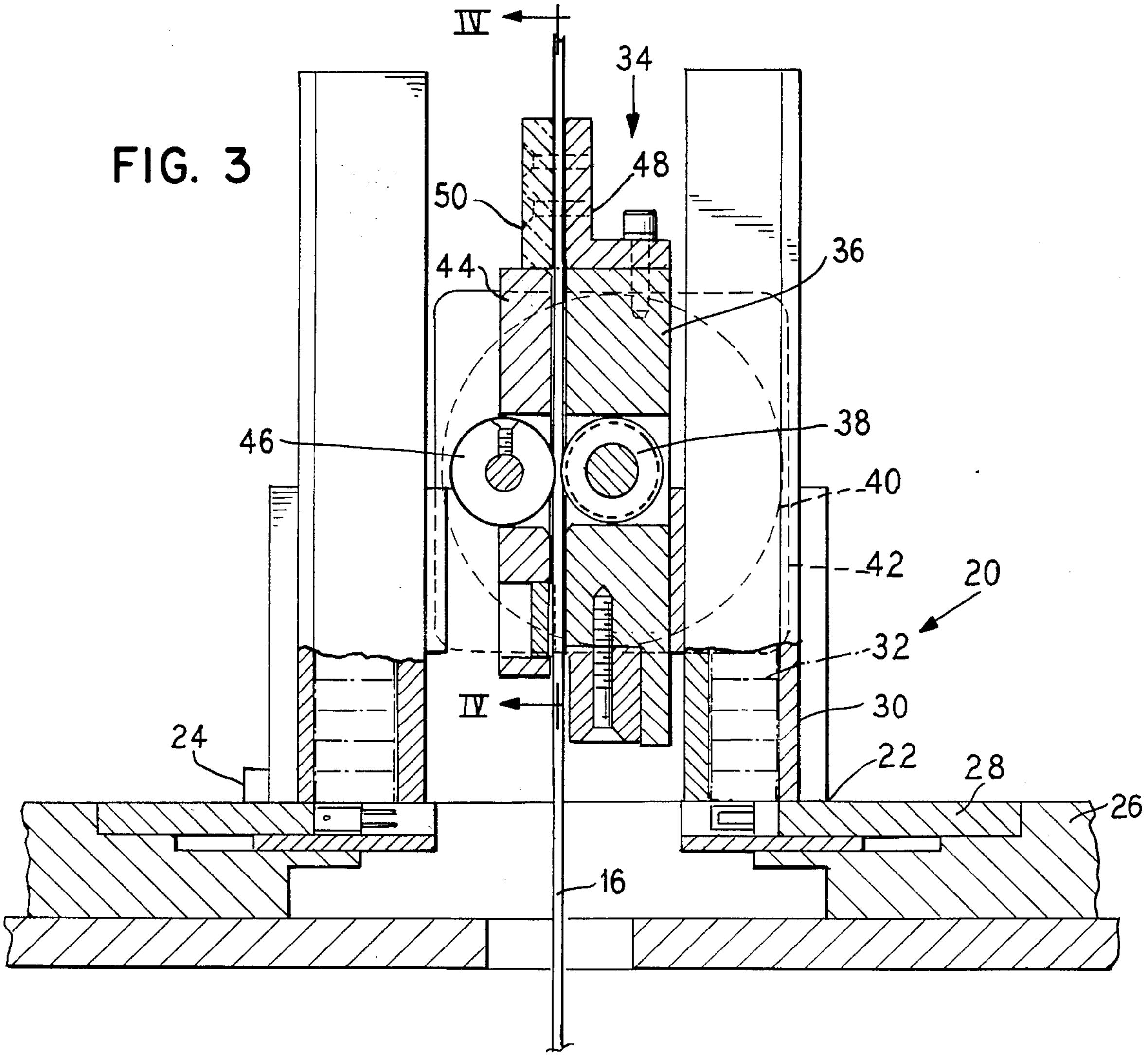
FIG. 3 is a sectional view taken along line 3—3 of FIG. 2 showing the roller and guide system in elevation.
Figure 2:
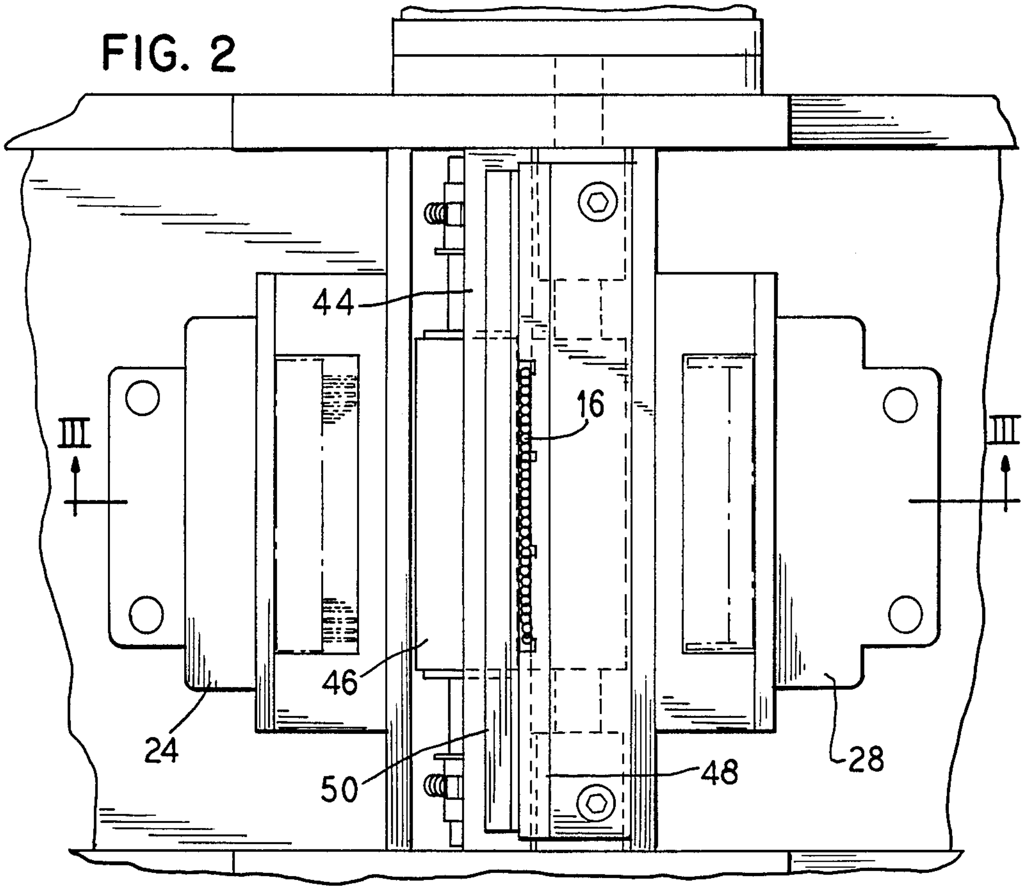
FIG. 2 is a top view showing the cable as it is guided in the connector applying station.

Internal portions of the machine are shown in FIGS. 2 and 3 and described hereinafter in connection with those figures, particularly FIG. 3. The connector applying station 20 includes two sections 22 and 24. Each section includes a horizontally movable ram, such as 26, which has a connector portion receiving ledge 28 for receiving a connector portion and cooperating in staking the connector portion to the cable. A vertically extending connector delivering magazine 30 carries a plurality of connector portions 32, which are fed by gravity to the connector applying ledge 28 and ram 26. As can be appreciated from the drawings, the connector may be of the two-piece style and the ram sections or applying sections are separated so that a cable, such as 16, can be fed and positioned therebetween. One piece connectors may also be used.

The guide apparatus is part of a roller housing 34 positioned between the idler wheel 18 and connector station 20 and adjacent the station 20. The housing 34 is positioned between the vertically extending magazine and is made up of two parts or sections mounted to the machine frame. The sections include a drive wheel housing or plate 36, which carries a knurled drive wheel or roller 38 that is driven by a stepping motor 40, which is carried on the frame of the machine 42. An idler roller housing or plate 44 in which an idler roller 46 is rotatably mounted is positioned opposite the drive roller 38. It is noted that the two housings 36 and 44 are spaced apart a distance substantially equal to the thickness of the cable 16 so that the cable may be guided to and engaged by the rollers 38 and 46.

Figure 4:
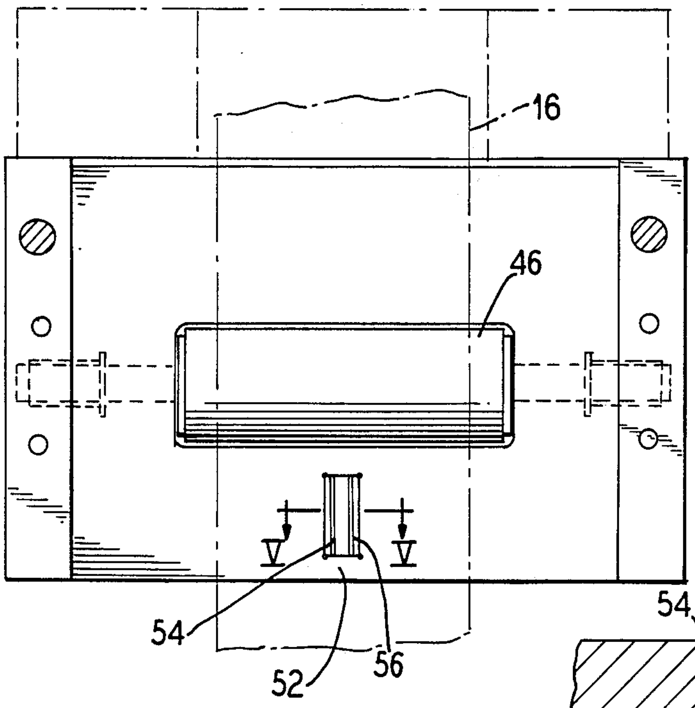
FIG. 4 is an elevational and sectional view taken along line 4—4 showing a face of the edge guide.

A slotted guide assembly is mounted at the top of the roller housing for guiding entering cable and providing transverse alignment. The assembly includes a first upwardly extending guide plate 48 which is mounted to the top of the drive wheel 36 and a second spaced guide plate 50 mounted to the idler plate 44. The plates are positioned adjacent each other and are spaced apart a distance substantially equal to the thickness of the conductor cable. As shown in FIG. 4, the width (W) of the slot is approximately the same as the width of the cable so as to provide the transverse alignment and still permit the cable to be vertically movable through the slot. This width may be different for different cables. Thus different guides are selected as appropriate for the cable size. It is seen that the entry guide housing is positioned between, but adjacent, the idler wheel 18 and rollers 38 and 46.

Referring now to FIG. 4, an edge guide 52 is shown as inserted in the idler roller housing or plate 44 below the idler roller and adjacent the connector applying station. The guide edge plate 52 includes a pair of outwardly extending elongated ribs or edges 54 and 56 which are generally parallel to the direction of cable movement.

Figure 5:
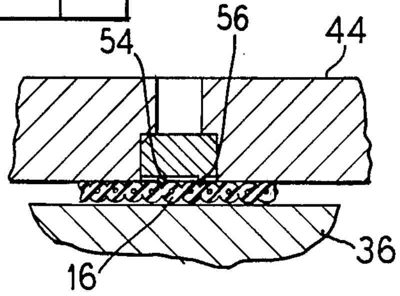
FIG. 5 is a horizontal sectional view taken along line 5—5 of FIG. 4 showing the cable in position and engaging the edge guide.

As seen in FIG. 5, the edges 54 and 56 are spaced apart a distance effective to position two conductor elements therebetween. The distance between the centers of the conductor elements in this situation can be 0.050 inch. Thus the distance between two conductor elements is 0.100 inch. Likewise, the distance between the grooves defining the insulation coverings for the two conductor elements is also 0.100 inch. In this situation, the guide 52 engages grooves of the cable 0.100 inch apart as the cable moves downwardly from the roller. It is to be noted that cables are available having different center distances, such as 0.100, 0.025 or 0.156 inch. The distance between guide edges is selected in accordance with the appropriate center distances.

By engagement as described the cable is accurately laterally guided in its downward movement to the conductor applying stations. It has been found that the use of the upper guide slot and lower guide edges accurately laterally positions the cable between the two sections of the connector applying station so as to assure accurate application of the conductor to the cable, thus reducing the misalignment which would result in shorts or opens or similar defects.

It will be appreciated that numerous changes and modifications can be made to the embodiment shown herein without departing from the spirit and scope of this invention.

I claim as my invention:

1. An apparatus for applying an electrical connector to flat multiconductor cable, which includes:
   - supply means for carrying and dispensing flat multiconductor cable;
   - drive means for receiving cable from the supply means delivering cable to a connector applying station;
   - a connector applying station including a pair of spaced sections for receiving connector sections and advancing and applying the connector sections to the cable; and
   - said drive means mounted in a housing positioned between the supply means and connector applying section;

wherein the improvement comprises there being further provided guide means for laterally positioning said cable in said connector applying station between said sections, said guide means comprising entry guide means positioned between the supply means and the drive roller means for engaging the cable and providing lateral alignment and exit guide means positioned between the drive roller means and connector applying sections for engaging the cable and accurately laterally positioning the same.

2. An apparatus as in claim 1, wherein said entry guide means includes housing means which define a guide slot for receiving a flat multiconductor cable, said slot being elongated and having a thickness greater than that of the cable and a width greater than that of the cable so as to laterally guide said cable as it moves through the slot.

3. An apparatus for applying an electrical connector to flat multiconductor cable, which includes:
   - supply means for carrying and dispensing flat multiconductor cable;
   - drive means for receiving cable from the supply means delivering cable to a connector applying station;
   - a connector applying station including a pair of spaced sections for receiving connector sections and advancing and applying connector sections to cable;
   - said drive means mounted in a housing positioned between the supply means and connector applying section;

wherein the improvement comprises there being further provided guide means for laterally positioning said cable in said connector applying station between said sections, said guide means comprising entry guide means positioned between the supply means and the drive roller means for engaging the cable and providing lateral alignment and exit guide means positioned between the drive roller means and connector applying sections for engaging the cable and accurately laterally positioning the same; and wherein said exit guide means includes a pair of spaced edge defining means arranged in a direction parallel to the movement of the cable and adapted to engage the cable and laterally guide its movement.

4. An apparatus as in claim 3, wherein said edge defining means includes a pair of spaced and parallel elongated ribs.

5. An apparatus as in claim 4, wherein flat cable conductor includes a plurality of spaced conductors surrounded by insulation which defines grooves therebetween and said ribs are spaced apart a distance equal to an integral multiple of the distance between the grooves.

6. An apparatus as in claim 5, wherein said ribs are spaced apart a distance adapted to engage the grooves on opposite sides of two conductors.

7. An apparatus as in claim 6, wherein the distance between the grooves is about 0.050 inch and the distance between the spaced ribs is about 0.100 inch.

* * * * *